United States Patent
Ramasamy et al.

(10) Patent No.: US 6,795,964 B2
(45) Date of Patent: Sep. 21, 2004

(54) EDGE PROFILING FOR EXECUTABLE PROGRAM CODE HAVING BRANCHES THROUGH STUB CODE SEGMENTS

(75) Inventors: Vinodha Ramasamy, Campbell, CA (US); Robert Hundt, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 684 days.

(21) Appl. No.: 09/883,710

(22) Filed: Jun. 18, 2001

(65) Prior Publication Data

US 2002/0194580 A1 Dec. 19, 2002

(51) Int. Cl.[7] .............................. G06F 9/44; G06F 9/45
(52) U.S. Cl. ...................... 717/130; 717/129; 717/158
(58) Field of Search ............................... 717/127–133, 717/158; 712/233–240

(56) References Cited

U.S. PATENT DOCUMENTS

| | | | | | |
|---|---|---|---|---|---|
| 5,842,017 A | * | 11/1998 | Hookway et al. | ........... | 717/158 |
| 5,946,486 A | * | 8/1999 | Pekowski | ................... | 717/128 |
| 5,970,245 A | * | 10/1999 | Poteat et al. | ................ | 717/128 |
| 6,026,235 A | * | 2/2000 | Shaughnessy | ............... | 717/127 |
| 6,233,729 B1 | * | 5/2001 | Campara et al. | ............ | 717/131 |
| 6,249,907 B1 | * | 6/2001 | Carter et al. | ................ | 717/129 |

OTHER PUBLICATIONS

S. Graham, P. Kessler, M. McKusick; gprof: a Call Graph Execution Profiler; Jun. 1982; Proceedings of the SIGPLAN '82 Symposium on Compiler Construction, SIGPLAN Notices, vol. 17, No. 6.*

* cited by examiner

Primary Examiner—Kakali Chaki
Assistant Examiner—Trent J Roche

(57) ABSTRACT

Method and apparatus for profiling edges that pass through stub code segments in executable program code. The compilation and linking of a computer program sometimes generates stub code segments that implement the transfer of control to functions that are external to a local segment of code. Branches through the stub code segments hinder the analysis of edges relative to the source code. In various embodiments of the invention, edges are created to represent respective branch instructions in the executable program code. Each edge has a source attribute, a target attribute, and an edge-taken count attribute. During execution, the numbers of times edges are taken are counted, and stub entry points and stub targets are identified. For each edge having a target that matches an entry point of a stub code segment, the edge target is changed to the stub target associated with the matching entry point. By identifying edges that target stub code segments, edges that target stub code segments can be combined with other edges for correlation with the source code.

14 Claims, 3 Drawing Sheets

EDGE PROFILING FOR EXECUTABLE PROGRAM CODE HAVING BRANCHES THROUGH STUB CODE SEGMENTS

FIELD OF THE INVENTION

The present invention generally relates to instrumentation of computer program code, and more particularly to profiling execution characteristics of a binary executable program having branches through stub code segments.

BACKGROUND

Executable computer programs include branch instructions that when executed direct program control to target addresses in the program. In some cases, branch instructions are used to transfer control to a code segment that implements a source-code defined function. For example, if the source code sets forth a "function" that averages an input list of values, the function may be invoked by name in the source code. The executable code includes a target code segment that implements the function and branch instructions having target addresses that reference the target code segment. It will be appreciated that different languages have different names for functions such as procedure, routine, or method.

Binary executable programs are "instrumented" or "profiled" to analyze program performance. The performance data that are gathered can be used to determine which source code might benefit most from improved coding. For example, if a particular function is called within a program loop and the loop is a hot spot during execution, it may be desirable to program the function in-line within the loop rather than as a function call.

A function call may either reference a target function in the same load module, or in a different load module. From the developer's perspective, the source code does not reference load modules. Where a function call references a function in another load module, the code generation and linking phase establishes a stub code segment that is targeted by a first branch instruction. The stub code segment obtains the address of the entry point of the target function in the other load module and then branches to the target. Since the stub code segments are typically not directly associated with any particular lines of the source code, the correlation of execution profile information with the source code can be difficult.

A method and apparatus that address the aforementioned problems, as well as other related problems, are therefore desirable.

SUMMARY OF THE INVENTION

The invention provides profiling of branches that pass through stub code segments in executable program code. The compilation and linking of a computer program sometimes generates stub code segments that implement the transfer of control to functions that are external to a local segment of code. Branches through the stub code segments hinder the analysis of the corresponding edges relative to the source code. In various embodiments of the invention, edges are created to represent respective branch instructions in the executable program code. Each edge has a source attribute, a target attribute, and an edge-taken count attribute. During execution, the numbers of times edges are taken are counted, and stub entry points and stub targets are identified. For each edge having a target that matches an entry point of a stub code segment, the edge target is changed to the stub target associated with the matching entry point. By identifying edges that target stub code segments, edges that target stub code segments can be combined with other edges for correlation with the source code.

Various example embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments, the invention profiles program execution by gathering execution counts of edges that represent a non-sequential transfer of control in the executable program and collapsing edges associated with stub code segments into edges that can be correlated with the source program. An edge symbolizes a control path in an executable program, and the number of times an edge is taken in executing the program may provide useful information for analyzing and improving program performance. In an example embodiment, edges are associated with branch instructions, and each edge has a source address (the address of the instruction) and a target address (the target address of the instruction). In another embodiment, edges have other attributes such as a weight attribute. Along with accumulating numbers of times edges are taken, the stub code segments that are executed are identified. In reporting edge execution frequencies, the identified stub code segments are used to correlate the edges with source code statements.

Figure 1A:
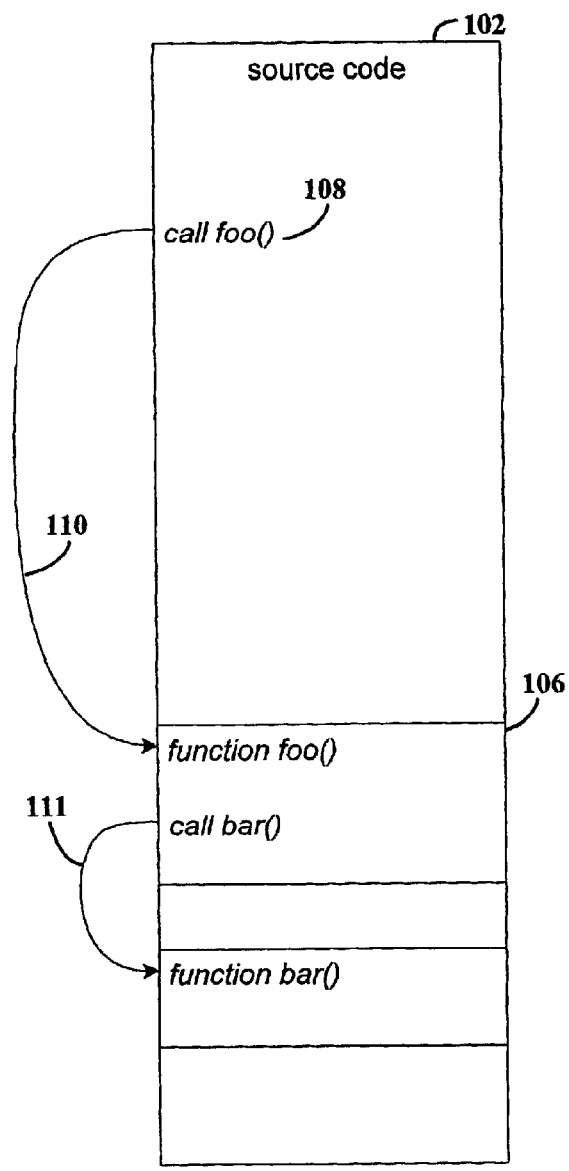
FIG. 1A illustrates one or more source code modules including a function call.

FIG. 1A illustrates one or more source code modules including a function call. Source code 102 is an example computer program written in a language such as C, C++ or any of a variety of other compiled languages. The source code includes the function foo( ) 106, which is called from elsewhere in the source code as shown by reference number 108. Line 110 represents an edge of the source code, with the source of the edge being at call foo( ) (ref. 110) and the target of the edge being at the entry point of foo( ) 106. Function foo( ) calls bar( ), which is represented as edge 111. Edges are useful in analyzing program performance because they can indicate not only the number of times a function was executed, but also the points in the program from which the function was called, as a function may be invoked from many different locations in the program.

Figure 1B:
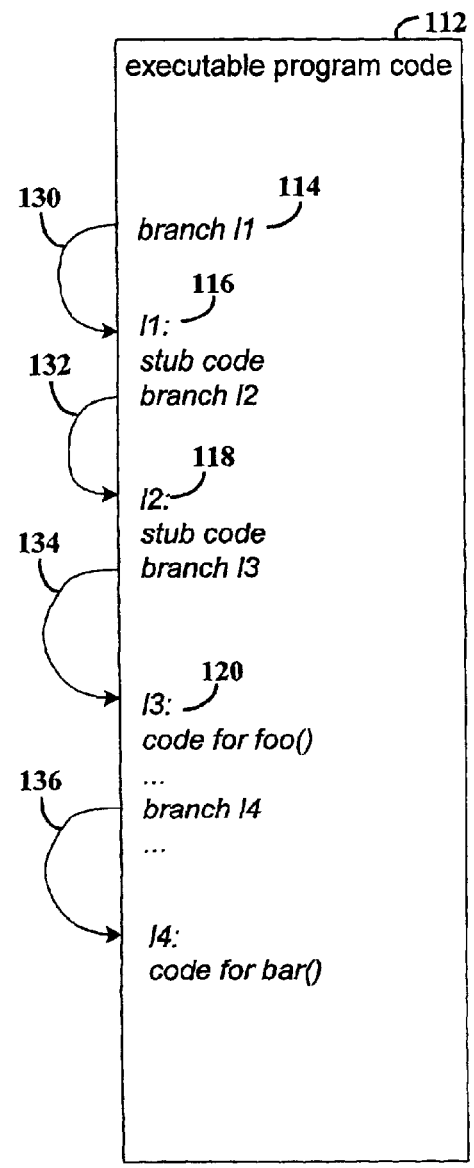
FIG. 1B illustrates executable program code in which a source code function call is translated into branches through stub code segments to the binary code that implements the function.

FIG. 1B illustrates executable program code in which a source code function call has been compiled and linked into branches through stub code segments to the binary code that implements the function. Executable program code 112 is generated from compilation and linking of example source code 102. Branch instruction 114 corresponds to the source code statement call foo( ) 108. However, in the example branch l1 114 branches to l1 (116), at which a stub code segment is located.

Stub code segments are generated in the compilation/linking process in a number of situations. For example, if the target code is in another load module, a stub code segment is generated to perform operations such as obtaining the address of the target entry point and the value of the global pointer from the linkage tables before branching to the target. Stub code segments are also generated to bridge an addressing distance between the source and the target if the target cannot be reached by an instruction pointer relative branch instruction. In another example, stub code segments are used in branching by reference to an alias of a function name. For example, a stub code segment links a call foo__( ) to the code for foo( ).

In some situations, there are branches through multiple stub code segments before reaching the target function, as illustrated by the stub code segments at labels l1 and l2 (118). The executable code for the function foo( ) is at label l3 (120) in the example.

In the example executable program code 112, the call foo( ) statement is implemented with branches through the two stub code segments at l1 and l2. The first branch instruction 114 branches to l1, the stub code at l1 branches to the stub code at l2, and the stub code at l2 branches to l3, which is the code for foo( ).

Three example edges 130, 132, and 134 are illustrated in the executable program code 112 for passing control from branch 114 to the code for foo( ). Edge 136 represents the call to the function bar( ) from foo( ). Since the stub code is generated in the compilation/linking of the source code and the executable does not have information that correlates the stub code to corresponding source code line numbers, analyzing control flow from the branch 114 to code for foo( ) at label l3 is difficult. From a developer's point of view, execution information pertaining to edge 110 is useful for analysis. However, edge 110 corresponds to edges 130, 132, and 134 in the executable program code 112. Since the stub code at l1 and l2 is not directly related to any source code, analyzing execution of the program and correlating the execution information of edges 130, 132, and 134 with the source code 102 can be difficult.

In various embodiments of the invention, the stub entry points and stub targets are identified and saved. The stub entry points and stub targets are then used when reporting to correlate edge-taken frequencies with the source code.

Figure 2:
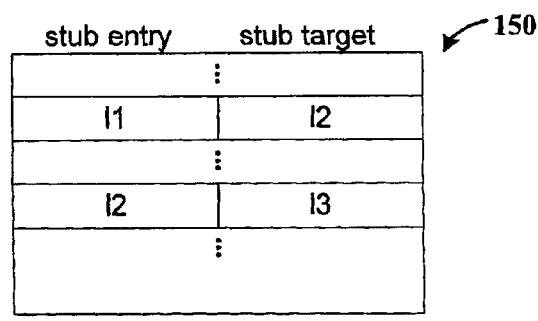
FIG. 2 illustrates an example stub map table that maps stub entry point addresses to the target addresses of the stub code segments.

FIG. 2 illustrates an example stub map table 150 that is used to map stub entry point addresses to the target addresses of the stub code segments. Even though addresses of the stub entry points and stub targets in the executable program are stored in the stub map table, table 150 is shown with the labels of the stub entry points and targets for purposes of illustration. Using the example of FIG. 1B, the stub code at label l1 has its entry point l1 mapped to the target of its stub code, l2. Similarly, the stub code at label l2 has its entry point l2 mapped to the target of its stub code, l3. The stub map table is used to trace edges through stub code segments to code that is not a stub, for example, the function foo( ). By tracing the edges through the stub map table, the execution information associated with the edges 130, 132, and 134 can be correlated to the source code 102 with edge 110 having a source at the call foo( ) statement and a target at the entry point of foo( ).

Figure 3:
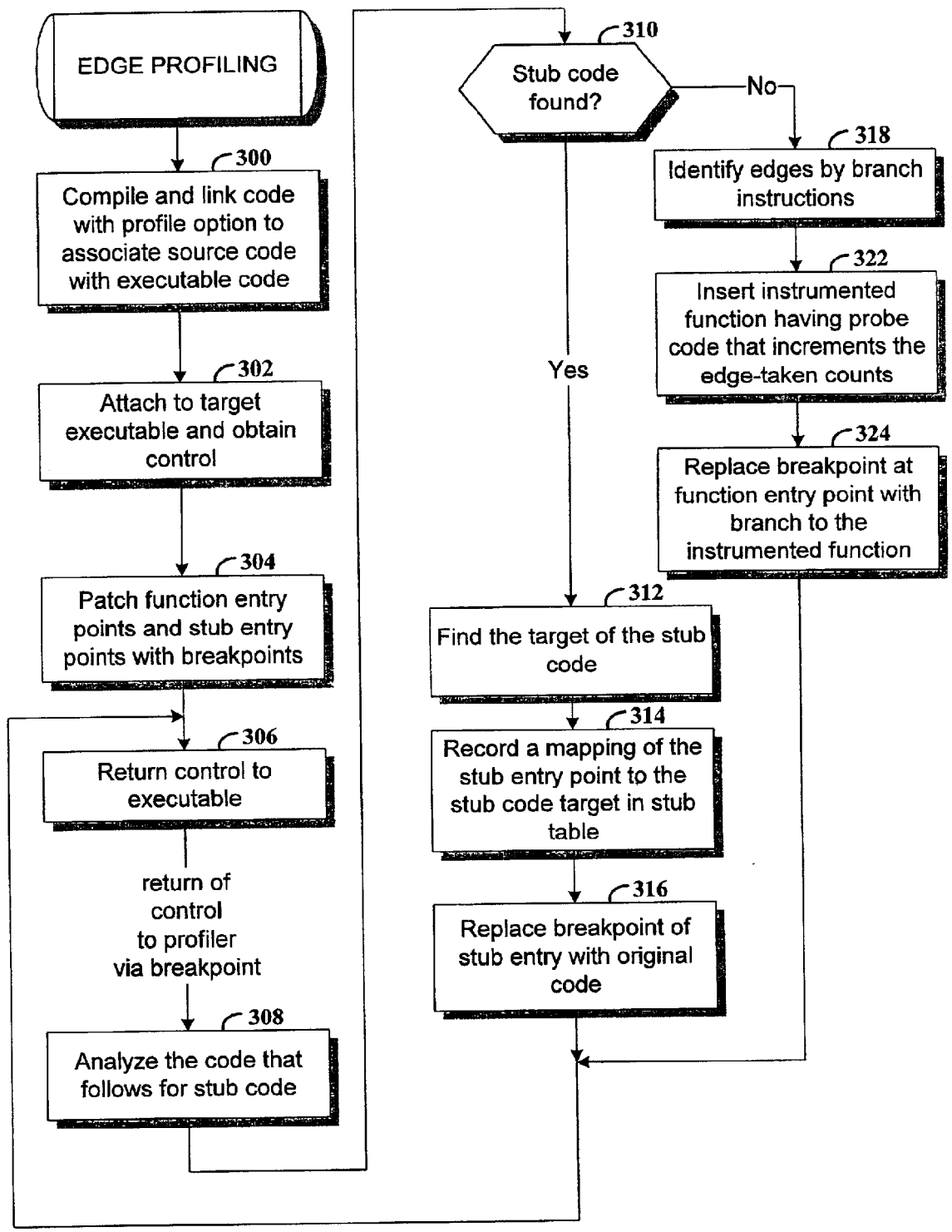
FIG. 3 is a flowchart of a process for profiling edges of executable program code in accordance with one embodiment of the invention.

FIG. 3 is a flowchart of a process for profiling edges of executable program code in accordance with one embodiment of the invention. At step 300, the source code is compiled and linked using the "profile" compiler option. The profile option creates a line table that associates lines of source code with corresponding instruction addresses in the executable program code.

At step 302, the profiler process attaches to a target executable application and obtains control. Those skilled in the art will appreciate that this step can be accomplished using known, conventional techniques. For example, in one embodiment the profiler process is part of an instrumentation tool.

At step 304, the function and stub entry points are patched with breakpoints, and the replaced instructions are saved for restoring later in the process. An example method for identifying function entry points is described in the patents/applications entitled, "COMPILER-BASED CHECKPOINTING FOR SUPPORT OF ERROR RECOVERY", by Thompson et al., filed on Oct. 31, 2000, and having patent/application No. 09/702,590, and "ANALYSIS OF EXECUTABLE PROGRAM CODE USING COMPILER-GENERATED FUNCTION ENTRY POINTS AND ENDPOINTS WITH OTHER SOURCES OF FUNCTION ENTRY POINTS AND ENDPOINTS", by Hundt et al., filed on Apr. 11, 2001, and having patent/application No. 09/833,249. The contents of both patents/applications are hereby incorporated by reference. Both functions and stub code segments can be identified by reference to the compiler-generated symbol table (not shown). Alternatively, the targets of branch instructions are analyzed with pattern matching for different types of stub code segments. At step 306, control is returned to the executable program.

Upon encountering a breakpoint, for example, at the entry point of a function or stub code, control is returned to the profiler process and step 308. At step 308, the code that follows the breakpoint in the executable program is analyzed for stub code. Decision step 310 directs the process to step 312 if stub code is found.

At step 312, the target of the stub code is determined from the stub code. The address of the breakpoint and the target of the stub code are stored in stub map table 150 at step 314. At step 316, the instruction that was saved at step 304 when replaced by the breakpoint is restored to the stub code. The process then returns to step 306 to continue execution of the executable program code.

If stub code is not found following the encountered breakpoint, decision step 310 directs the process to step 318. At step 318, the process identifies edges in the function by locating branch instructions. Since breakpoints were placed at the entry points of stub code segments and functions only, if the code is not stub code, the code following the breakpoint is a function. For example, in the code for foo( ) at l3 in FIG. 1B, the branch l4 instruction is used as the source of edge 136. At step 322, the function is replaced with an instrumented version (foo'( )) having probe code. The probe code increments the edge-taken counts for all edges in the function. For example, the edge-taken count is incremented for edge 136 when the corresponding probe code in foo'( ) is executed. (FIG. 1B). One approach to dynamically instrumenting functions of a program is described in the U.S. patent application entitled, "Dynamic Instrumentation of an Executable Program", by Hundt et al., filed on Apr. 11, 2001, and having patent/application No. 09/833,248, which is assigned to the assignee of the present invention and incorporated herein by reference.

At step 324, the breakpoint at the entry point of the function is replaced with a branch to the newly instrumented version of the function. The process then returns to step 310 where control is returned to the executable program.

Figure 4:
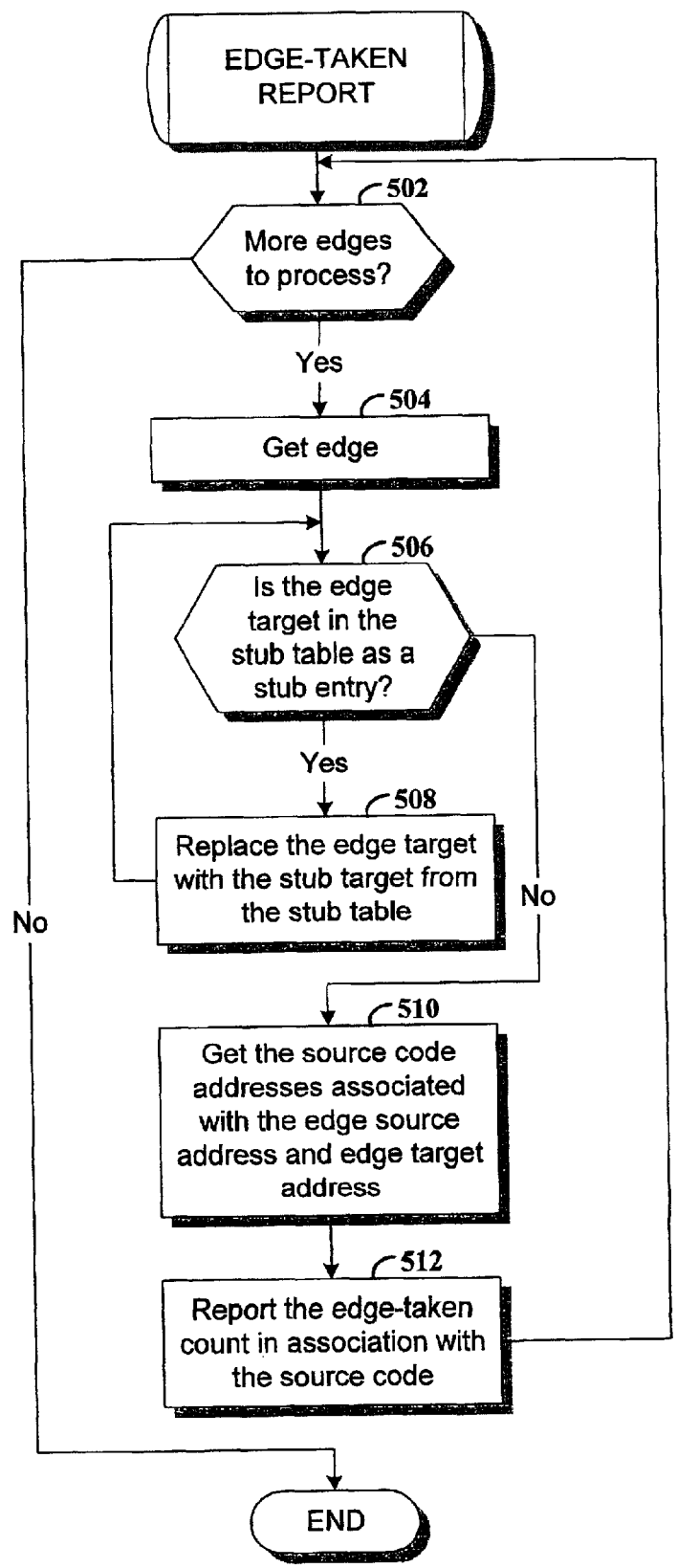
FIG. 4 is a flowchart of an example process for reporting edge profile data.

FIG. 4 is a flowchart of a process for reporting edge profile data in accordance with one embodiment of the invention. The process uses the stub map table 150 to correlate edges through stub code segments with the source code. While there are more edges to process, decision step 502 directs the process to step 504 to get an edge to process.

If the target of the edge is the entry point of a stub in the stub map table 150, the process is directed to step 508. The edge target is replaced with the target associated with the matching stub entry point from the stub map table. The process is then directed to decision step 506 to check whether the new target of the edge is a stub entry point. Steps 506 and 508 are repeated until the target of the edge does not match a stub entry point in the table. The process is then directed to step 510.

At step 510, the edge source and the edge target are correlated with lines of source code using the line table from step 300 of FIG. 3, for example. At step 512, the edge-taken count of the edge is reported in association with the source code line numbers for the edge source and the edge target. The process is then directed to decision step 502 to determine whether there are more edges to process. When the edge-taken counts of all the edges have been reported, the process is complete.

In addition to the various aspects and embodiments of the invention specifically mentioned, others will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for generating edge profile data for executable program code generated from source code, comprising:

creating edges that represent respective branch instructions in the executable program code, each edge having associated therewith a source attribute, a target attribute, and an edge-taken count attribute;

counting numbers of times the branch instructions are executed and assigning values of the numbers to the edge-taken count attributes of the edges;

identifying entry point addresses and target addresses of stub code segments in the executable program code; and for any edge having an edge target attribute that matches an entry point address of a stub code segment, changing the edge target attribute to the stub target address associated with the matching entry point address.

2. The method of claim 1, further comprising:

patching selected instructions in the executable program with breakpoints;

upon encountering an breakpoint during program execution, determining whether instructions that follow the breakpoint comprise a stub code segment; and if a stub code segment is found, associating the entry point address with the target address of the stub code segment.

3. The method of claim 2, further comprising:

saving the selected instructions patched with breakpoints; and replacing a breakpoint with a corresponding instruction upon encountering the breakpoint.

4. The method of claim 3, further comprising: upon encountering an breakpoint during program execution, determining whether instructions that follow the breakpoint comprise a stub code segment or a function; and if a function is found, providing an instrumented version of the function to execute in lieu of the function, wherein the instrumented version of the function increments the values of edge-taken count attributes for edges in the function.

5. The method of claim 2, further comprising:

upon encountering an breakpoint during program execution, determining whether instructions that follow the breakpoint comprise a stub code segment or a function; and if a function is found, providing an instrumented version of the function to execute in lieu of the function, wherein the instrumented version of the function increments the values of edge-taken count attributes for edges in the function.

6. The method of claim 1, further comprising providing as output data values of the edge-taken count attributes in association with source code line numbers associated with the edge source attributes and the edge target attributes.

7. An apparatus for generating edge profile data for executable program code generated from source code, comprising:

means for creating edges that represent respective branch instructions in the executable program code, each edge having associated therewith a source attribute, a target attribute, and an edge-taken count attribute;

means for counting numbers of times the branch instructions are executed and assigning values of the numbers to the edge-taken count attributes of the edges;

means for identifying entry point addresses and target addresses of stub code segments in the executable program code;

means, for any edge having an edge target attribute that matches an entry point address of a stub code segment, for changing the edge target attribute to the stub target address associated with the matching entry point address.

8. A computer-implemented method for generating edge profile data for executable program code generated from source code, comprising:

for each branch instruction in the executable program code, storing an address of the branch instruction as an edge source address and storing a target address of the branch instruction as an edge target address;

associating source addresses and target addresses of selected ones of branch instructions with source code line numbers;

counting numbers of times the branch instructions are executed as respective edge-taken counts;

storing entry point addresses of stub code segments in association with target addresses of the stub code segments;

for each edge target address that matches an entry point address of a stub code segment, replacing the edge target address with the stub target address associated with the matching entry point address; and associating the edge-taken counts with the edge source addresses.

9. The method of claim 8, further comprising providing as output data the edge-taken counts in association with source code line numbers associated with the edge source addresses and the edge target addresses.

10. The method of claim 8, further comprising:

patching selected instructions in the executable program with breakpoints;

upon encountering an breakpoint during program execution, determining whether instructions that follow the breakpoint comprise a stub code segment; and if a stub code segment is found, associating the entry point address with the target address of the stub code segment.

11. The method of claim 10, further comprising:

saving the selected instructions patched with breakpoints; and replacing a breakpoint with a corresponding instruction upon encountering the breakpoint.

12. The method of claim 10, further comprising:

upon encountering an breakpoint during program execution, determining whether instructions that follow the breakpoint comprise a stub code segment or a function; and if a function is found, providing an instrumented version of the function to execute in lieu of the function, wherein the instrumented version of the function increments the values of edge-taken count attributes for edges in the function.

13. The method of claim 10, further comprising:

upon encountering an breakpoint during program execution, determining whether instructions that follow the breakpoint comprise a stub code segment or a function; and if a function is found, providing an instrumented version of the function to execute in lieu of the function, wherein the instrumented version of the function increments the values of edge-taken count attributes for edges in the function.

14. An apparatus for generating edge profile data for executable program code generated from source code, comprising:

means, for each branch instruction in the executable program code, for storing an address of the branch instruction as an edge source address and storing a target address of the branch instruction as an edge target address;

means for associating source addresses and target addresses of selected ones of branch instructions with source code line numbers;

means for counting numbers of times the branch instructions are executed as respective edge-taken counts;

means for storing entry point addresses of stub code segments in association with target addresses of the stub code segments;

means, for each edge target address that matches an entry point address of a stub code segment, for replacing the edge target address with the stub target address associated with the matching entry point address; and means for associating the edge-taken counts with the edge source addresses.

* * * * *